United States Patent [19]
Barrett et al.

[11] Patent Number: 5,460,071
[45] Date of Patent: Oct. 24, 1995

[54] POWER DRIVEN CASING SPLITTER APPARATUS

[75] Inventors: Robert E. Barrett, Plainfield; Herman A. Voss, Frankfort, both of Ill.

[73] Assignee: Northern Illinois Gas Company, Aurora, Ill.

[21] Appl. No.: 138,586

[22] Filed: Oct. 18, 1993

[51] Int. Cl.⁶ .............................. F16L 55/18; B26D 1/18
[52] U.S. Cl. ................................ 83/744; 83/487; 83/745; 30/92.5
[58] Field of Search .................... 83/745, 485, 487, 83/54, 743, 872, 873, 744; 30/90.4, 92, 92.5, 394, 372

[56] References Cited

U.S. PATENT DOCUMENTS

| | | | |
|---|---|---|---|
| 1,315,865 | 9/1919 | Schanno | 30/92.5 |
| 3,613,236 | 10/1971 | Lauck | 30/92.5 |
| 5,009,007 | 4/1991 | Martin et al. | 83/745 X |
| 5,185,928 | 2/1993 | Martin et al. | 83/745 X |

Primary Examiner—Rinaldi I. Rada
Assistant Examiner—Clark F. Dexter
Attorney, Agent, or Firm—Emrich & Dithmar

[57] ABSTRACT

A carriage having rotary cutter wheels is mounting for reciprocation on a frame adapted to be rigidly secured to a pipe casing which is desired to be split along a line parallel to its axis. A hydraulic motor is mounted to the frame at one end of the carriage. A rotary crank driven by the motor is coupled to an arm which is also coupled to drive the carriage in a reciprocating motion. An adjustable hydraulic valve controls the speed of the motor, and thus the speed of the cutter. An adjustable stabilizer is mounted to the frame to stabilize the cutter by bracing against the carrier pipe within the casing.

4 Claims, 2 Drawing Sheets

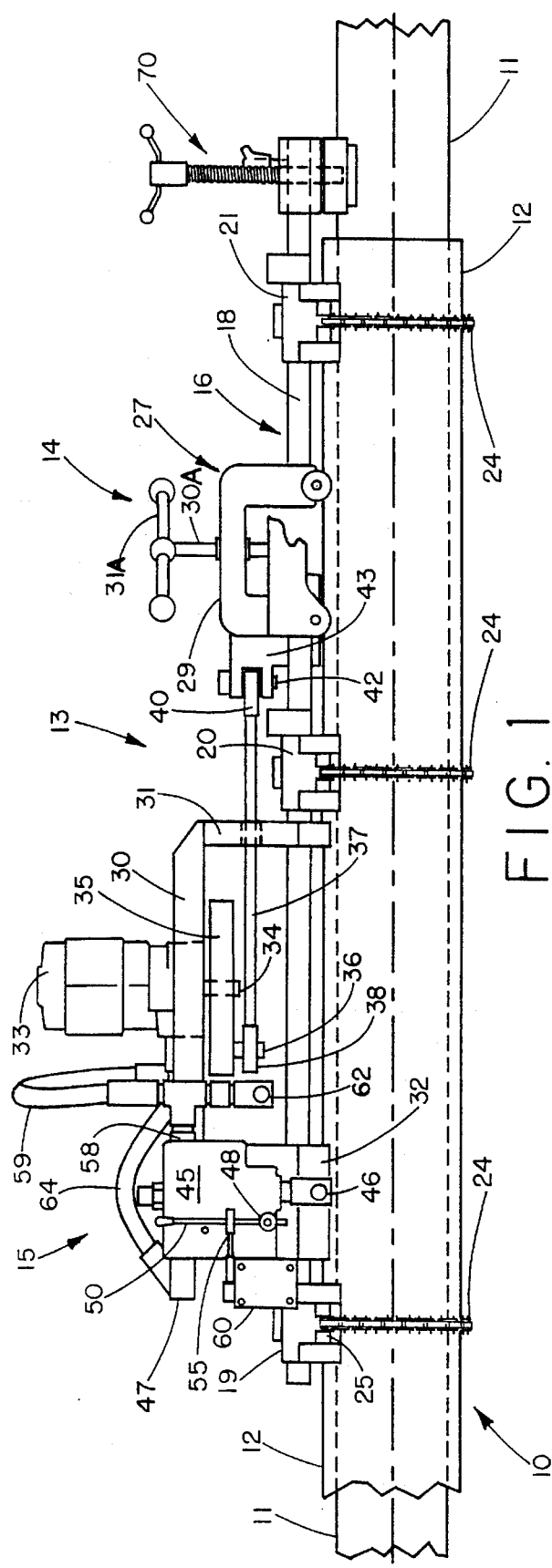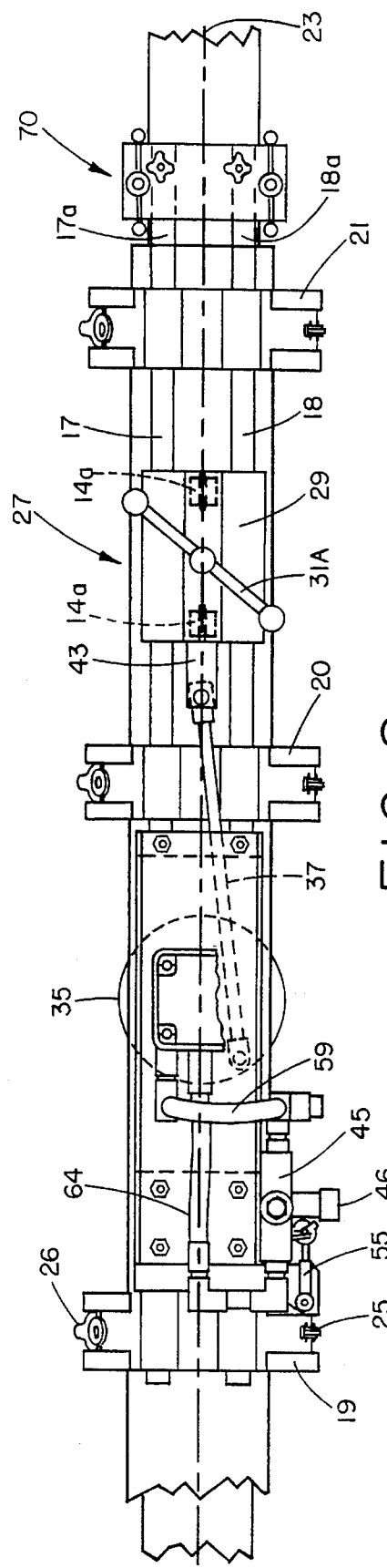

POWER DRIVEN CASING SPLITTER APPARATUS

FIELD OF THE INVENTION

The present invention relates to apparatus for longitudinally cutting or "splitting" axially the casing for a pipe; and more particularly, it relates to a power-driven apparatus for splitting the casing of carrier pipe used in the distribution of natural gas.

BACKGROUND OF THE INVENTION

In the natural gas industry, it is common to distribute the gas through a rigid, steel pipe having a circular cross-section and called a "carrier" pipe. The carrier pipe is sheathed by a large diameter "casing" such as plastic wrap.

In making repairs, replacements or modifying distribution systems, operating crews frequently have to remove the rigid casing from the carrier pipe. Removal of the casing may be accomplished by cutting the casing about a circumference at spaced intervals so that the casing is in segments, and then removing the individual segments between the peripheral cuts using an axial pipe cutter. A conventional axial pipe cutter or casing splitter, as it is sometimes referred to, has a carriage mounted on a frame, and the carriage is moved manually back and forth along the frame after the frame is mounted to the casing. The manual reciprocation of the cutter is by means of a long lever arm. Not only is it time consuming and tiring to remove pipe casing in this manner, but it is frequently difficult or very inconvenient to do so, particularly when the section of casing to be removed is located in a difficult location. Moreover, it is frequently inconvenient or difficult to locate the manual pipe cutter at a radial location about the circumference of the casing other than on top of the casing because the actuating lever arm must be located in a position to be conveniently forced back and forth by a person and access ditches are formed only as large as needed.

The present invention includes an axial pipe splitter (which may be the conventional manual cutter described above) having a carriage and rotary cutter wheels mounted for reciprocation on a frame. In the present invention, the frame is extended axially of the pipe, and a hydraulic motor is mounted on the frame off one end of the carriage. The drive shaft of the motor is provided with a rotary crank in the form of a disk, and a drive arm is connected between the rotary crank and the carriage of the cutter so that as the motor rotates, the rotary crank and drive arm convert the rotational motion of the motor drive shaft to a reciprocating motion of the carriage.

The frame of the apparatus in the disclosed embodiment is extended to the other side of the carriage (that is, to the side distal from the motor mounting); and this second frame extension is provided with a stabilizer assembly which may be adjusted radially of the pipe to engage directly the carrier pipe and to grip it with a pair of pads to stabilize the frame of the apparatus as the cutter carriage is reciprocated back and forth. This prevents the frame and the cutter carriage from creeping in an axial direction.

In the course of a particular cut, it is necessary for an operator to tighten the carriage so that the rotary cutters are forced further into the casing as the outer portions of the casing are cut. To accomplish this safely, the motor is provided with a speed control device so that the operator may slow the motor down, or stop it, while making this adjustment. Further, in a preferred embodiment, the hydraulic valve which controls the speed has a lever arm, and the apparatus is provided with a locking mechanism to secure the speed control operating arm in the stopped position. This safety feature prevents inadvertent actuation of the cutter carriage, for example, when the device is being moved to a new cutting location.

Other features and advantages of the present invention will be apparent to persons skilled in the art from the following detailed description of a preferred embodiment accompanied by the attached drawing wherein identical reference numerals will refer to like parts in the various views.

BRIEF DESCRIPTION OF THE DRAWING

FIG. 1 is a side view of apparatus constructed according to the present invention assembled to a natural gas distribution line;

FIG. 2 is a plan view of the apparatus of FIG. 1;

DETAILED DESCRIPTION OF A PREFERRED EMBODIMENT

Figure 3:
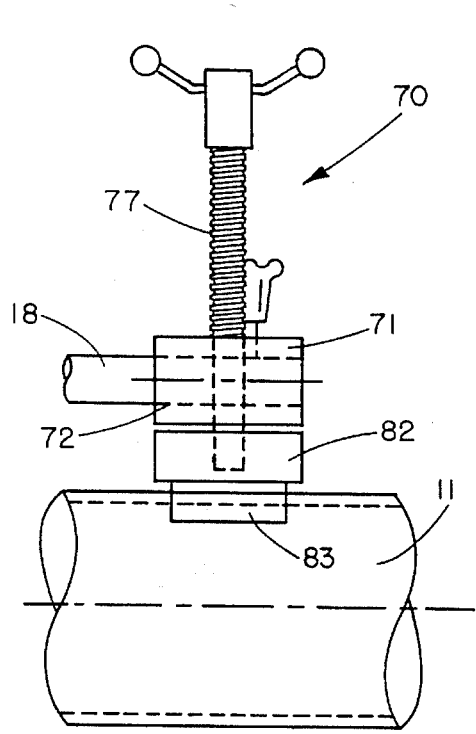
FIG. 3 is a close-up side view of the stabilizer assembly of the apparatus of FIG. 1.

Referring first to FIG. 1, reference numeral 10 generally designates a distribution line of the type used in distribution systems for natural gas. It includes an inner rigid metal pipe 11 and an outer, protective casing 12. In its normal form, the casing 12 extends continuously and unbroken, forming a non-metallic protective sheathing or cover for the pipe 11.

Assembled to the distribution line 10 is a power-driven casing splitter constructed according to the present invention and generally designated by reference numeral 13. The apparatus 13 includes a reciprocating cutter apparatus generally designated 14 and a power head generally designated 15 for driving the cutter 14.

Figure 6:
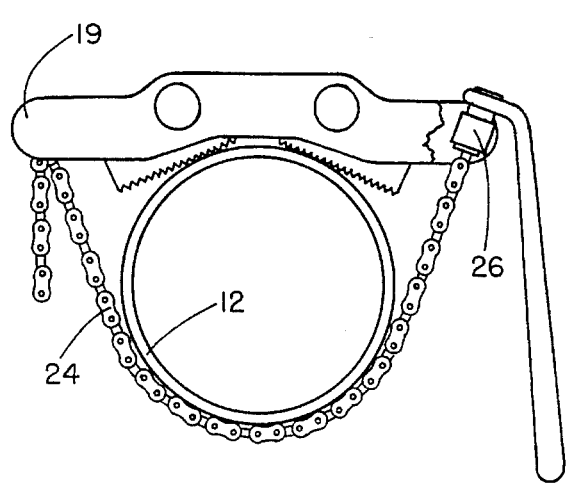
FIG. 6 is a sectional view of the casing illustrating the bracket and lever arrangement for securely attaching a chain around the casing and maintaining the chain under tension.

The reciprocating cutter 14 and the power head 15 are mounted on a common frame generally designated 16. The frame 16 includes first and second elongated metal rods 17, 18 (FIG. 1). The rods 17, 18 are received in and rigidly secured to three brackets 19, 20 and 21 spaced along the axis (illustrated by chain line 23) of the distribution line, thus forming a rigid frame. Each of the brackets 19–21 forms the base of a conventional chain pipe clamp. Each of the pipe clamps is similar so that only one need by described in more detail for an understanding of the invention. Turning to the bracket 19, a chain 24 has one end connected to the bracket 19 at 25, and the other end is attached at 26 (FIG. 2) to the bracket 19 by means of a lever adapted to tension the chain and secure it rigidly in wrapping engagement with the casing 12 as shown in FIG. 6. Similar chains designated 24 are shown in FIG. 1 for the brackets 20 and 21.

As best seen from FIG. 2, the rods 17, 18 are provided with portions 17A, 18A which extend to the right of the bracket 21 of the right-side chain pipe clamp.

Between the brackets 20, 21, of the middle and right-side chain pipe clamps, the cutter includes a carriage 27 which is mounted to the rods 17, 18 and adapted to travel along those rods. The carriage 27 includes a top section 29 which receives a threaded rod 30A provided, at its top, with a handle 31A. At the bottom of the rod 30A there is a cutter member having first and second rotary cutters 14a aligned along the axis 23. As the handle 31A is turned in one direction, the rod 30A forces the cutters downwardly relative to the frame 16 so that the cutter disks are forced into cutting engagement with the casing 12. The reciprocating cutter as thus described is similar to Model 208 Axial Pipe Cutter sold by Rigid Tool Company of Elyria, Ohio. Other reciprocating axial pipe cutters may work equally well in the present apparatus.

Turning now to the left side of FIGS. 1 and 2, the power head 15 includes a subframe comprising a horizontal mounting plate 30, a right upright wall 31 and a left upright section 32. The right upright wall 31 and the left upright section 32 are mounted rigidly to the rods 17, 18 of the frame 16, and they are also bolted (as best seen in FIG. 2) to the horizontal mounting plate 30. A hydraulic motor 33 is mounted to the plate 30, with its drive shaft 34 extending downwardly beneath the plate 30 and received in the center of a circular crank or flywheel 35. A stub shaft 36 is fitted into the circular crank 35, and a crank arm 37 is rotatably mounted to the stub shaft 36 by means of a collar 38. The right side of the arm 37 is mounted by a similar collar 40 to a pin 42 mounted to a connecting member 43 which, in turn, is mounted to the carriage 27 of the reciprocating cutter. Thus, as the motor 33 is energized, it rotates and drives the rotary crank 35 in rotation. As the stub shaft 36 rotates about a vertical axis, it drives the connecting rod 37 to reciprocate the carriage 27.

Mounted to the left upright section 32 is a hydraulic valve 45 having an inlet 46, an outlet 47, and a control member 48 which actuates a valve spool located within the housing of the valve 45. An upright lever arm 50 is mounted to the control member 48 and extends upwardly, as seen in FIG. 1. A safety latch 55 is mounted to a block 60 to the left of the valve 45, and is adapted to engage and lock the lever arm 50 when the lever arm 50 is in the upright position shown in the drawing.

If the safety latch 55 is rotated clockwise (as seen in FIG. 2), it disengages the lever arm 50, and the lever arm 50 is free to be actuated by the operator. To actuate the lever arm 50, it is turned clockwise as seen in FIG. 1, thereby rotating the control member 48 clockwise and controlling the valve which, in turn, controls the flow of hydraulic fluid from the inlet 46 to the outlet 47. The overflow or diverted fluid from the valve 46 exits through a second outlet port 58, which is connected by means of a hydraulic T-fitting to a hydraulic hose 59 through which the hydraulic fluid is routed from the motor 33 to an outlet port 62. The hydraulic fluid from the power outlet 47 of the valve 45 to the inlet of the motor 33 is routed through a second hydraulic hose designated 64 in the drawing.

As seen at the right side of FIGS. 1 and 2, a stabilizer assembly generally designated 70 is received on the extensions portions 17A, 18A of the rods 17, 18 of the frame 16. The purpose of the stabilizer assembly 70 is to secure the frame 16 through direct, adjustable contact with the pipe 11. As mentioned, the casing 12 is removed in sections (proceeding from right to left in the illustration of FIG. 1). It can be seen at the right of FIG. 1 that the right portion of the casing 12 has been removed. It has been found that the chain pipe clamps 19–21, though effective to secure the frame 16 against radial motion about the casing, do not adequately secure the apparatus against axial motion or "creep". To this end, the stabilizer assembly 70 has been found to be effective and, in particular, by permitting adjustable engagement directly with the section of the pipe 11 from which the casing 12 has already been removed.

Figure 4:
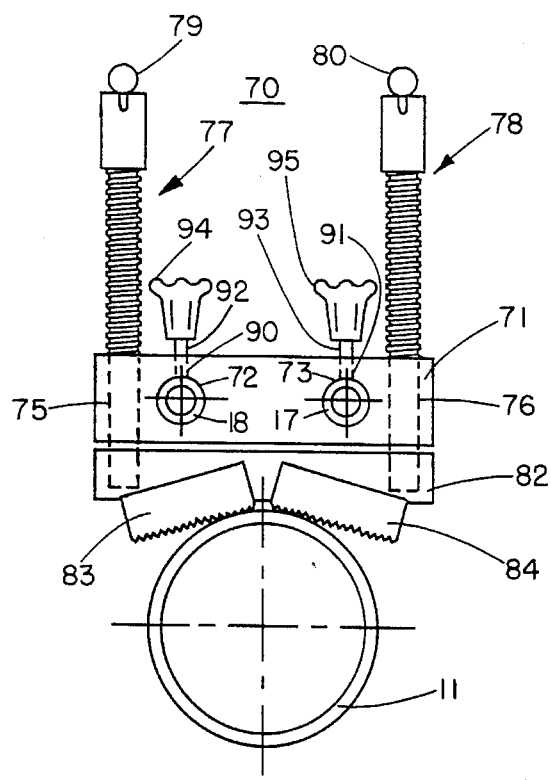
FIG. 4 is an end view, taken from the right side, of the stabilizer assembly of FIG. 3.
Figure 5:
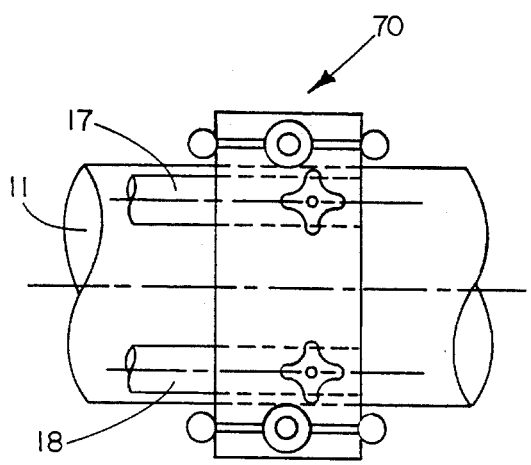
FIG. 5 is a plan view of the stabilizer assembly of FIGS. 3 and 4.

Turning now to FIGS. 3–5, the stabilizer assembly 70 includes a transverse block 71 which has two horizontal bores 72, 73 for receiving respectively the rods 18, 17 of the frame 16. The block 71 also includes two vertical bores which are internally threaded and designated respectively 75, 76 in FIG. 4 for receiving threaded rods 77, 78 respectively. The rods 77, 78 are fitted with handles, 79, 80 respectively to facilitate turning of the threaded rods to tighten the stabilizer assembly against the pipe.

At the bottom of the rods 77, 78, there is a lower horizontal block 82 to which are mounted first and second gripping pads 83, 84 respectively. The pads 83, 84 are designed to engage and secure themselves to the outer surface of the pipe 11 and stabilize the frame against the pipe by friction.

The block 71 also includes first and second smaller, internally threaded, vertical bores 90, 91 extending upwardly respectively from the horizontal bores 72, 73 which receive the rods 18, 17. The bores 90, 91 are internally threaded for receiving screws 92, 93 respectively. The screws 92, 93 are provided with grips 94, 95. The grips 94, 95 turn the screws 92, 93 to clamp the block 71 of the stabilizer assembly to the rods 18, 17 respectively. When the grips 94, 95 loosen their associated screws, the block 71 may be adjusted along the length of the frame, as will be apparent.

In operation, the frame is first assembled to the casing 12 by securing the chain pipe clamps 19, 20 and 21. The handle 31 of the rotary cutter carriage 27 is tightened so that the rotary cutters are in engagement with the casing. Then, the safety latch 55 may be rotated out of the way so that the control lever 50 is free to control the speed of the motor 33 by rotating the control member 48. Before the motor is started, however, the stabilizer assembly 70 is properly adjusted along the length of the frame 16 by means of the grips 94, 95 and their associated screws 92, 93. After the stabilizer assembly is moved to a desirable position, the handles 79, 80 are turned to lower the block 82 and force the gripping pads 83, 84 into engagement with the pipe 11 to stabilize the frame against longitudinal movement.

During the course of cutting, the rotary cutters must be adjusted in order to cut more deeply into the casing, and this is accomplished by first rotating the control lever 50 to slow down the motor 33. This permits the operator to turn the handle 31 to exert the desired force on the rotary cutters. The motor may then be returned to its normal operating speed.

When it is desired to move the apparatus to a different axial position, the lever arm 50 is rotated counterclockwise as shown in FIG. 1 to shut off the motor 33 and the lever arm 50 is locked in place by means of the safety latch 55. The stabilizer assembly and pipe clamps may then be loosened to move the entire apparatus as a unit.

Having thus disclosed in detail a preferred embodiment of the invention, persons skilled in the art will appreciate that certain substitutions may be made. For example, if electricity is available, the hydraulic motor 33 may be replaced by an equivalent electric motor. Further, the system may be used with equivalent reciprocating cutters, if desired. Persons skilled in the art will appreciate that other equivalent elements may be substituted for those disclosed while continuing to practice the principle of the invention. It is, therefore, intended that all such modifications and substitutions be covered as they are embraced within the spirit and scope of the appended claims.

I claim:

1. Apparatus for splitting the casing of a carrier pipe comprising:

a frame;

a plurality of adjustable chain clamps on said frame for securing said frame to said casing;

a carriage having rotary cutting means;

said carriage movably mounted to said frame for linear reciprocating motion axially of said pipe when said frame is assembled to said casing;

a motor mounted to said frame and having a rotating drive shaft;

drive means coupled to said drive shaft and including an arm connected to said carriage for converting the rotary motion of said motor to said linear reciprocating motion of said carriage;

adjustable means for controlling the speed of said motor, whereby when said frame is secured to said casing by said chain clamps and said motor is energized, said carriage is reciprocated axially of said casing and said rotary cutting means splits said casing; and a stabilizer assembly mounted to said frame and adapted to engage said pipe at a location where the casing has been removed from said pipe, said stabilizer assembly comprising at least one pad for engaging said pipe, means for mounting said pad, and an adjustable screw means for moving said mounting means toward said pipe and forcing said pad into engagement with said pipe.

2. The apparatus of claim 1 wherein said motor is a hydraulic motor, and further including an adjustable hydraulic control valve for selectively controlling the flow of hydraulic fluid under pressure to said motor to control the speed of said motor.

3. The apparatus of claim 2 wherein said hydraulic control valve includes an operating lever, said system further including a latch to secure said operating lever in the off position whereby said motor may be turned off and said latch prevents said motor from being started until said latch is disengaged from said control lever.

4. The apparatus of claim 1 wherein said frame comprises first and second elongated parallel rods extending longitudinally of the axis of said pipe once said frame is assembled to said pipe, and said plurality of adjustable chain-clamps including a plurality of brackets rigidly securing said rods together wherein each of said brackets is further equipped with a chain for clamping the associated bracket to said casing.

* * * * *